(12) United States Patent
Abe et al.

(10) Patent No.: US 11,719,860 B2
(45) Date of Patent: Aug. 8, 2023

(54) ANTIREFLECTION STRUCTURE AND METHOD OF MANUFACTURING THE SAME

(71) Applicant: DENSO CORPORATION, Kariya (JP)

(72) Inventors: Yoshihiro Abe, Kariya (JP); Toshiaki Watanabe, Nagakute (JP); Shinichiro Matsuzawa, Nagakute (JP)

(73) Assignee: DENSO CORPORATION, Kariya (JP)

( * ) Notice: Subject to any disclaimer, the term of this patent is extended or adjusted under 35 U.S.C. 154(b) by 266 days.

(21) Appl. No.: 16/872,233

(22) Filed: May 11, 2020

(65) Prior Publication Data
US 2020/0271830 A1    Aug. 27, 2020

Related U.S. Application Data

(63) Continuation of application No. PCT/JP2018/041648, filed on Nov. 9, 2018.

(30) Foreign Application Priority Data

Nov. 13, 2017 (JP) ................................. 2017-218149

(51) Int. Cl.
*G02B 1/118* (2015.01)
*B60R 1/00* (2022.01)
(Continued)

(52) U.S. Cl.
CPC .............. *G02B 1/118* (2013.01); *B60R 1/001* (2013.01); *G01S 13/931* (2013.01); *G02B 1/115* (2013.01); *G01S 2013/93276* (2020.01)

(58) Field of Classification Search
CPC ................. B60R 1/001; G01S 13/931; G01S 2013/93276; B32B 7/023; G02B 5/285–288
See application file for complete search history.

(56) References Cited

U.S. PATENT DOCUMENTS

2016/0356926 A1* 12/2016 Takahashi ............... C03C 3/321

FOREIGN PATENT DOCUMENTS

EP      2871491 A1     5/2015
FR      2975506 A1 *  11/2012 ............. B82Y 20/00
(Continued)

OTHER PUBLICATIONS

Baranov et al. (Broadband antireflective coatings based on two-dimensional arrays of subwavelength nanopores, Applied Physics Letters 106, 171913 (2015) (Year: 2015).*
(Continued)

*Primary Examiner* — Kimberly N. Kakalec
(74) *Attorney, Agent, or Firm* — Maschoff Brennan

(57) ABSTRACT

An antireflection structure includes an antireflection film provided on a front surface of a substrate. The antireflection film has a plurality of holes that are spatially and periodically arranged and pass through front and back surfaces of the antireflection film. A thickness and a relative dielectric constant of the antireflection film are set according to a relative dielectric constant and a thickness of the substrate and an incident angle θ of an electromagnetic wave. The thickness and the relative dielectric constant of the antireflection film are set for an electromagnetic wave incident at the angle θ so that, for example, an electromagnetic wave reflected by the antireflection film provided on the front surface of the substrate and an electromagnetic wave reflected by a back surface of the substrate deviate from each other by a half wavelength and cancel each other.

19 Claims, 6 Drawing Sheets

(51) Int. Cl.
    *G01S 13/931* (2020.01)
    *G02B 1/115* (2015.01)

(56) References Cited

FOREIGN PATENT DOCUMENTS

JP   2008-249678 A   10/2008
JP   2015-190810 A   11/2015

OTHER PUBLICATIONS

Mirotznik et al. (Broadband antireflective properties of inverse motheye surfaces, IEEE Transactions on Antennas and Propagation, vol. 58, No. 9, pp. 2969-2980, 2010). (Year: 2010).*

* cited by examiner (a) VERTICALLY POLARIZED WAVE (b) HORIZONTALLY POLARIZED WAVE (c) 45° POLARIZED WAVE (a) VERTICALLY POLARIZED WAVE (b) HORIZONTALLY POLARIZED WAVE (c) 45° POLARIZED WAVE (a) VERTICALLY POLARIZED WAVE (b) HORIZONTALLY POLARIZED WAVE (c) 45° POLARIZED WAVE

ANTIREFLECTION STRUCTURE AND METHOD OF MANUFACTURING THE SAME

CROSS-REFERENCE TO RELATED APPLICATION

The present application is a continuation application of International Application No. PCT/JP2018/041648, filed Nov. 9, 2018, which claims priority to Japanese Patent Application No. 2017-218149, filed Nov. 13, 2017. The contents of these applications are incorporated herein by reference in their entirety.

BACKGROUND

1. Technical Field

The present disclosure relates to an antireflection structure and a method of manufacturing the same.

2. Related Art

In recent years, an increasing number of vehicles are equipped with a millimeter wave radar device using a millimeter wave as an electromagnetic wave. Typically, the millimeter wave radar device is arranged inside the vehicle, and millimeter waves are emitted from the millimeter wave radar device and transmitted through a windshield, for example, to measure a distance to a target outside the vehicle.

SUMMARY

The present disclosure provides an antireflection structure. As an aspect of the present disclosure, an antireflection structure includes a substrate and an antireflection film. The antireflection film is provided on a front surface of the substrate. The antireflection film is made of a material having a relative dielectric constant lower than a relative dielectric constant of the substrate. The antireflection film has a plurality of holes each of which has a predetermined radius and that are formed to pass through front and back surfaces of the antireflection film in a given spatial arrangement pattern and formed to control a relative dielectric constant of the antireflection film. A thickness and the relative dielectric constant of the antireflection film are set according to a thickness and the relative dielectric constant of the substrate and a angle θ on the substrate so that reflection on the front surface of the antireflection film and reflection on a back surface of the substrate cancel each other.

BRIEF DESCRIPTION OF THE DRAWINGS

In the accompanying drawings.

DETAILED DESCRIPTION OF THE PREFERRED EMBODIMENTS

Figure 1:
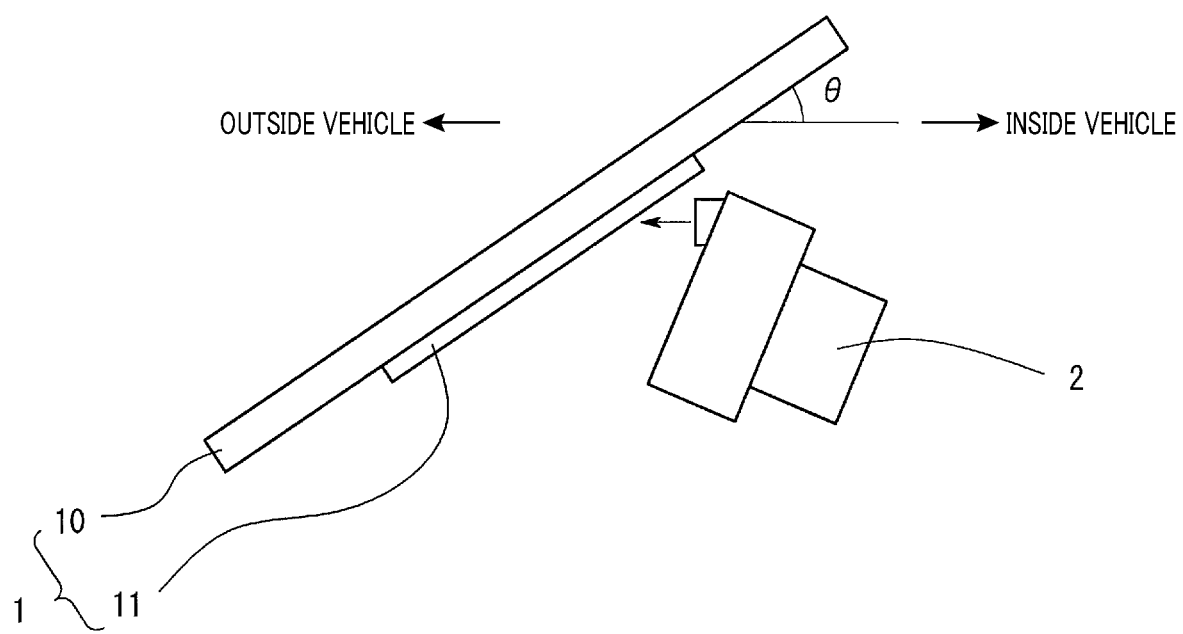
FIG. 1 shows a configuration of an antireflection structure of a first embodiment.

The millimeter wave radar device is arranged inside the vehicle, and millimeter waves are emitted from the millimeter wave radar device and transmitted through a windshield, for example, to measure a distance to a target outside the vehicle. In this configuration, reflection of the millimeter waves from a surface of the windshield may cause large loss and lead to a short detection distance. The reflection of the millimeter waves from the surface of the windshield is caused by a difference in relative dielectric constant between air and glass. The windshield has a relatively high relative dielectric constant as compared with air, and this causes strong reflection.

Known methods of reducing the reflection include a method in which a dielectric film having a relative dielectric constant intermediate between those of air and glass and having a properly set thickness is provided on both surfaces or one surface of glass. However, the relative dielectric constant and the thickness of the dielectric film need to be changed according to a relative dielectric constant and a thickness of the windshield, an incident angle of an electromagnetic wave, and the like. Thus, a wide variety of members need to be prepared for various vehicle types.

Other known methods of reducing the loss include techniques disclosed in JP 2015-92154 A, JP 2008-249678 A, and JP 2015-190810 A. JP 2015-92154 A (hereinafter referred to as "PTL 1") discloses that loss is reduced by controlling a polarization direction. JP 2008-249678 A (hereinafter referred to as "PTL 2") discloses that transmission loss is reduced by forming asperities on a back surface of a resin component that covers a radar device. JP 2015-190810 A (hereinafter referred to as "PTL 3") discloses that loss is reduced by adjusting a mounting angle of a lens antenna and bonding a resin sheet having a varying thickness to a surface of glass.

In the method of PTL 1, however, a millimeter wave radar actually uses polarized waves in various polarization directions such as a horizontal direction, a vertical direction, and a direction of 45°. A structure in which the polarization direction is changed to reduce transmission loss requires a large-scale mechanism. In many cases, therefore, mounting the structure on a device is unrealistic. Furthermore, control of the polarization direction causes a large control load and is thus not easy. Accordingly, a structure capable of reducing transmission loss in any polarization direction has been demanded.

PTL 2, in which reduction of the transmission loss is possible by forming asperities, has a problem in which the effect of reducing the loss is small for oblique incidence of an electromagnetic wave. PTL 2 also has a problem in which processing of glass to form asperities on the glass is not easy.

The method of PTL 3 requires production of many films having a continuously varying thickness according to a mounting angle of a radar, a thickness of the glass, and the like, and thus requires time, effort, and cost. Furthermore, accurate production of films having a desired thickness is not easy.

Thus, an object of the present disclosure is to provide an antireflection structure capable of reducing transmission loss simply and at low cost.

In order to achieve the above object, as an aspect of the present disclosure, the present disclosure provides an antireflection structure that reduces or prevents reflection of electromagnetic waves incident at a desired angle on a substrate. The antireflection structure includes: the substrate; and an antireflection film provided on a front surface of the substrate. The antireflection film is made of a material having a relative dielectric constant lower than a relative dielectric constant of the substrate. The antireflection film has a plurality of holes each of which has a predetermined radius and that are formed to pass through front and back surfaces of the antireflection film in a given spatial arrangement pattern and formed to control a relative dielectric constant of the antireflection film. A thickness and the relative dielectric constant of the antireflection film are set according to a thickness and the relative dielectric constant of the substrate and the angle θ so that reflection on the front surface of the antireflection film and reflection on a back surface of the substrate cancel each other.

Furthermore, the above configuration may be modified in various manners. For example, the antireflection film may be composed of multiple layers. The thickness of the antireflection film can be easily controlled by changing the number of laminated layers of the antireflection film. Furthermore, the thickness of the antireflection film can be easily controlled by combining layers having different thicknesses.

The plurality of holes are preferably formed in a periodic pattern, and a period of the pattern is preferably ½ or less of a wavelength of an electromagnetic wave. This makes it possible to reduce more transmission loss of the antireflection structure. For the same reason, the radius of each of the holes is preferably ¼ or less of a wavelength of an electromagnetic wave.

A method of manufacturing an antireflection structure that prevents reflection of an electromagnetic wave incident at a desired angle, which is another aspect of the present disclosure, includes providing an antireflection film on a front surface of a substrate. The antireflection film is made of a material having a relative dielectric constant lower than a relative dielectric constant of the substrate. The antireflection film has a plurality of holes each of which has a radius and that are formed to pass through front and back surfaces of the antireflection film in a given arrangement pattern and formed to control a relative dielectric constant of the antireflection film. A thickness and the relative dielectric constant of the antireflection film are set according to a thickness and the relative dielectric constant of the substrate and the angle θ so that reflection on the front surface of the antireflection film and reflection on a back surface of the substrate cancel each other.

The antireflection structure of the present disclosure is capable of reducing transmission loss simply and at low cost.

A specific embodiment of the present disclosure will be described below with reference to the drawings. However, the present disclosure is not limited to the embodiment.

First Embodiment

FIG. 1 is a diagram showing a configuration of an antireflection structure of a first embodiment. As shown in FIG. 1, an antireflection structure 1 of the first embodiment is composed of a substrate 10 and an antireflection film 11 provide on a front surface 10a of the substrate 10. The first embodiment assumes that a millimeter wave radar device 2 is arranged inside a vehicle, and a millimeter wave at a frequency of 76.5 GHz is emitted from the millimeter wave radar device 2 and transmitted through the antireflection structure 1, and a target outside the vehicle is irradiated with the millimeter wave.

As another example of the present disclosure, an antireflection structure may be provided as a structure including the antireflection film 11 without including the substrate.

The substrate 10 is a windshield of the vehicle which is an object through which a millimeter wave as an electromagnetic wave is transmitted. The windshield is made of a glass material having a relative dielectric constant of approximately 6. As shown in FIG. 1, the millimeter wave radar device 2 is arranged so that a direction of millimeter wave irradiation from the millimeter wave radar device 2 forms an angle θ, for example, from a horizontal direction in a vehicle stationary state with respect to the front surface 10a of the substrate 10.

The material of the substrate 10 is not limited to glass, but may be any material. Other than glass, the material of the substrate 10 may be a resin material or the like. For example, the configuration of the present disclosure is also applicable when a radar device is arranged on a rear side of a bumper made of resin and electromagnetic waves are emitted from the radar device and transmitted through the bumper. However, the configuration of the present disclosure is suitable for the case where the substrate 10 is made of an inorganic material such as glass. This is because glass is usually difficult to process for forming asperities on a surface in order to reduce reflection, and therefore this disclosure provides an easier way to use glass when reducing reflection.

The substrate 10 may have any thickness. Furthermore, the substrate 10 may have any relative dielectric constant. However, the present disclosure is suitable for the case where the substrate 10 has a high relative dielectric constant. This is because, although the substrate 10 having a higher relative dielectric constant causes larger transmission loss, the present disclosure can effectively reduce the transmission loss. The present disclosure is suitable, for example, for the case where the relative dielectric constant is 5 or more.

The substrate 10 is not limited to a monolayer, that is, the substrate 10 may be composed of a plurality of layers. For example, the substrate 10 may be composed of laminated glass in which a resin layer is sandwiched between two glass plates.

Figure 2:
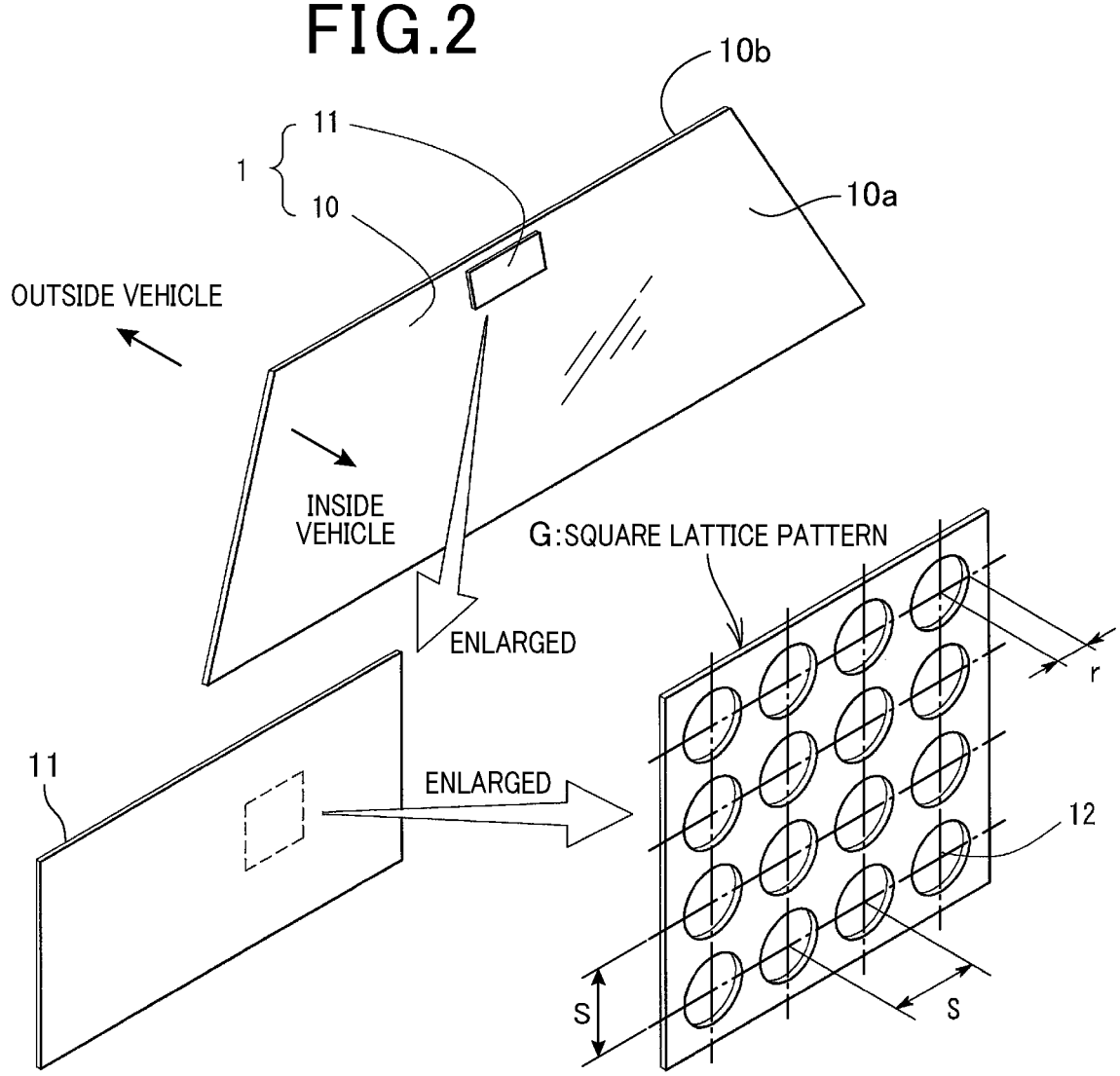
FIG. 2 shows a configuration of the antireflection structure of the first embodiment.

As shown in FIG. 2, the antireflection film 11 is provided in a region on the front surface 10a of the substrate 10 through which a millimeter wave from the millimeter wave radar device 2 is transmitted. No antireflection film 11 is provided in other regions.

The front surface 10a of the substrate 10 is a surface on a side (inside the vehicle) on which the millimeter wave radar device 2 is arranged, and the front surface 10a faces the millimeter wave radar device.

As shown in an enlarged view in FIG. 2, the antireflection film 11 has a plurality of open holes 12. The plurality of holes 12 are spatially and periodically arranged. Specifically, the holes 12 are arranged in a square lattice pattern. That is, the plurality of holes 12 adjacent to each other are arranged to form a square lattice (see reference sign G in FIG. 2). The holes 12 pass through front and back surfaces of the antireflection film 11 and have a circular shape. A relative dielectric constant of the antireflection film 11 is adjusted by changing a radius r of the holes 12 and a distance S between the holes 12 adjacent to each other (i.e., a period of spatial distribution of the holes).

A material of the antireflection film 11 may be any material that has a lower relative dielectric constant than the substrate 10. In particular, a resin material is preferable in terms of easy manufacturing, cost, and the like. The material of the antireflection film 11 may be, for example, nylon 66, polyacetal, vinylidene fluoride, ABS resin (Acrylonitrile Butadiene Styrene), phenolic resin, epoxy resin, or the like, or may be FRP (Fiber Reinforced Plastics).

Figure 7:
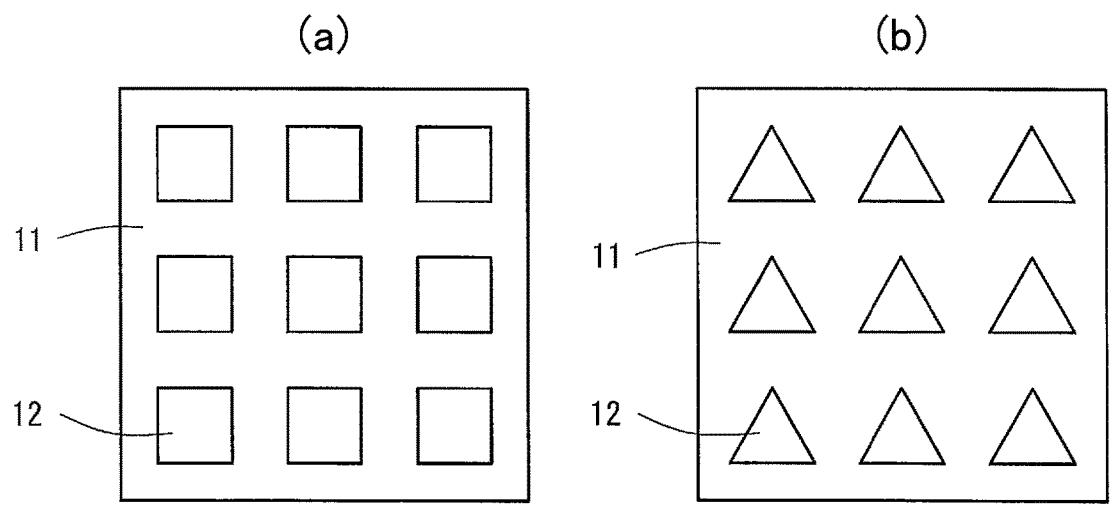
FIG. 7 shows an example of a pattern of the antireflection film 11.

The shape of the holes 12 is not limited to a circular shape, but may be any shape such as a rectangular, triangular, hexagonal, or elliptical shape. FIG. 7 (*a*) shows an example in which the holes 12 having a square shape are arranged in a square lattice pattern. FIG. 7 (*b*) shows an example in which the holes 12 having an equilateral triangle shape are arranged in a square lattice pattern.

The arrangement of the holes 12 is not limited to the square lattice pattern, but may be a periodic pattern such as an equilateral triangular lattice pattern, a quasi-periodic pattern, or a non-periodic pattern. However, when the relative dielectric constant has an in-plane distribution, transmission loss also has an in-plane distribution, and thus, in order to achieve a uniform in-plane refractive index distribution, the holes 12 are preferably arranged in a square lattice pattern or an equilateral triangular lattice pattern. Alternatively, the holes 12 may be arranged in a pattern so that the relative dielectric constant has a predetermined in-plane distribution to thereby achieve a lens effect.

The radius r of the hole 12 (radius of a circumcircle of the hole 12 when the hole 12 has a shape other than the circular shape) is preferably ¼ or less of a wavelength $\lambda 0$ of an electromagnetic wave that is transmitted through the hole 12, and the period S is preferably ½ or less of the wavelength $\lambda 0$. This makes it possible to reduce more transmission loss of the antireflection structure 1. In the first embodiment, since a millimeter wave at a frequency of 76.5 GHz is transmitted through the hole 12, the radius r is preferably 0.975 mm or less and the period S is preferably 1.95 mm or less.

A thickness and the relative dielectric constant of the antireflection film 11 are set according to the relative dielectric constant and the thickness of the substrate 10, and the angle $\theta$, for example, with respect to the horizontal direction in the vehicle stationary state. The thickness and the relative dielectric constant of the antireflection film 11 are set for a millimeter wave incident at the angle $\theta$ on a front surface of the antireflection structure 1 so that a millimeter wave reflected by the front surface of the antireflection film 11 and a millimeter wave reflected by a back surface 10*b* of the substrate 10 deviate from each other by a half wavelength and cancel each other. By reducing reflection on the antireflection film 11 in this manner, reduction of the transmission loss is possible. Thus, the antireflection film 11 has a plurality of holes each of which has a radius and that are formed to pass through the front and back surfaces of the antireflection film in a given arrangement pattern, thereby controlling an effective relative dielectric constant of the antireflection film.

The relative dielectric constant of the antireflection film 11 is preferably set to, for example, a range higher than the square root of the relative dielectric constant of the substrate 10 and lower than the relative dielectric constant of the substrate 10. When the antireflection film 11 has a relative dielectric constant in this range, the relative dielectric constant of the antireflection film 11 can be easily set so that the transmission loss of the antireflection structure 1 is reduced.

The angle $\theta$ may be set to a desired value, and the antireflection structure 1 of the first embodiment can effectively reduce the reflection even when a millimeter wave is obliquely incident on the substrate. In particular, the antireflection structure 1 of the first embodiment can reduce the reflection in a wide range of 30° to 60° and reduce the transmission loss of the antireflection structure 1 to 1 dB or less.

Figure 8:
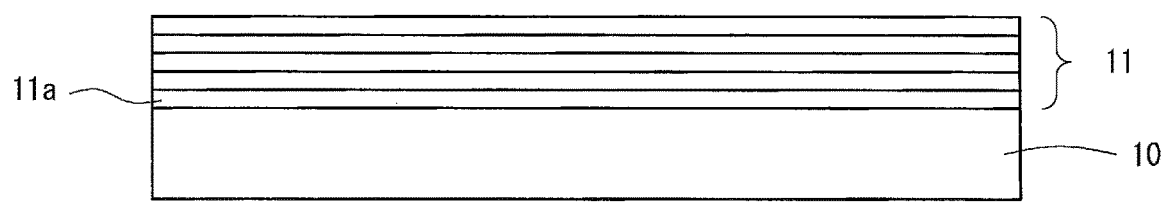
FIG. 8 shows an example of a configuration of the antireflection film 11.

As shown in FIG. 8, the thickness of the antireflection film 11 is preferably adjusted by simply laminating a plurality of sheets 11*a*. In this case, the thickness of the antireflection film 11 may be adjusted by preparing sheets having different thicknesses and combining the sheets. This makes it possible to simply adjust the thickness of the antireflection film 11. Alternatively, more simply, the thickness of the entire antireflection film 11 may be adjusted by preparing a plurality of sheets having the same thickness and changing the number of laminated sheets.

For example, the antireflection film 11 having various thicknesses can be achieved by preparing four types of sheets having a thickness of 25 µm, 50 µm, 100 µm, and 200 µm and combining the four types of sheets. For example, the antireflection film 11 having a thickness of 575 µm can be achieved by preparing two sheets having a thickness of 200 µm, a single sheet having a thickness of 100 µm, a single sheet having a thickness of 50 µm, and a single sheet having a thickness of 25 µm and laminating these sheets.

By changing the radius r of the holes 12 and the period S of the pattern of the holes 12 for each of the layers, the relative dielectric constant may be controlled so that the layers have different relative dielectric constants. For example, by setting the relative dielectric constants of the layers so that the relative dielectric constant is gradually increased toward the substrate 10, the transmission loss can be reduced more.

As has been described, the antireflection structure 1 of the first embodiment can reduce the transmission loss at a desired angle $\theta$ for any polarized wave by the simple method in which the relative dielectric constant of the antireflection film 11 is set by changing the radius r or the pattern of the holes 12 of the antireflection film 11. Furthermore, in the antireflection structure 1 of the first embodiment, only a single type of material of the antireflection film 11 is required, and the relative dielectric constant and the thickness of the antireflection film 11 can be easily controlled, thereby reducing manufacturing cost of the antireflection structure 1. Furthermore, in the antireflection structure 1 of the first embodiment, the transmission loss is reduced in a large angle range, and thus even when an error occurs in the size of the radius or the pattern of the plurality of holes 12 of the antireflection film 11, variation of the transmission loss is small. That is, the antireflection structure 1 of the first embodiment has an advantage that the antireflection structure 1 is less likely to be influenced by a manufacturing error. A method of manufacturing an antireflection structure includes providing an antireflection film on the front surface 10*a* of the substrate 10. A plurality of holes are formed on the antireflection film so that the holes pass through the back surface of the antireflection film in a given arrangement pattern. The formed plurality of holes 12 are used to control the relative dielectric constant of the antireflection film.

Next, results of various simulations regarding the first embodiment will be described.

Figure 3:
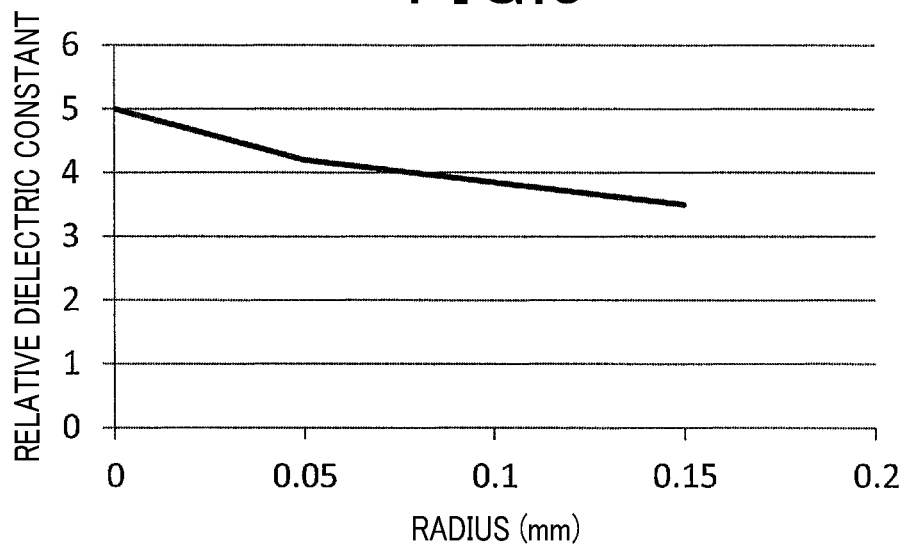
FIG. 3 is a graph showing a relationship between a relative dielectric constant of an antireflection film 11 and a radius r of a hole 12.

FIG. 3 is a graph showing the result of a relationship between the relative dielectric constant of the antireflection film 11 and the radius r of the holes 12 obtained by performing a simulation when in a configuration in which the antireflection film 11 has a thickness of 0.65 mm and a relative dielectric constant of 5, the period S of the square lattice pattern is 0.5 mm.

As shown in FIG. 3, it has been found that as the radius of the holes 12 is increased, the relative dielectric constant is reduced. For example, when the radius r is 0.05 mm, the relative dielectric constant is 4.2, and when the radius r is 0.15 mm, the relative dielectric constant is 3.5. Thus, it has been found that the relative dielectric constant of the antireflection film 11 can be controlled to be continuously changed by changing the radius r of the holes 12 of the antireflection film 11. From the result, it can be easily assumed that the relative dielectric constant of the antireflection film 11 can be controlled to be changed also by changing the period S of the pattern.

Figure 4:
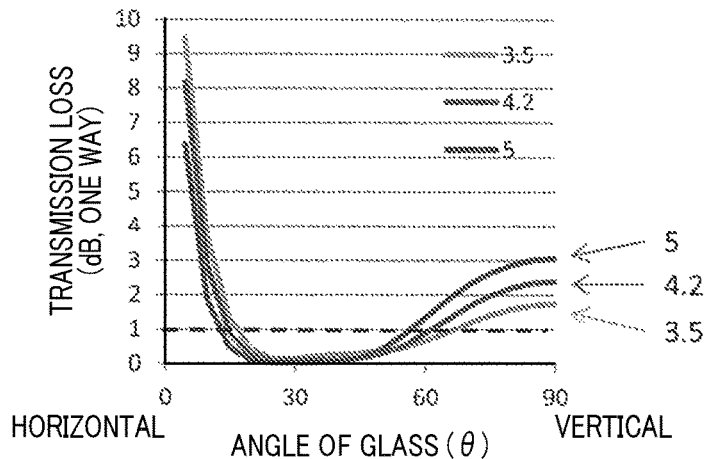
FIG. 4 is a graph showing a relationship between a transmission loss (dB) of the antireflection structure and an angle θ of the first embodiment.
Figure 4:
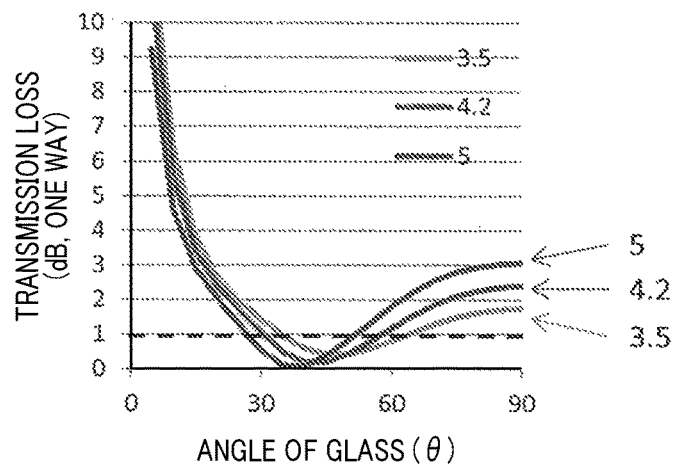
Figure 4:
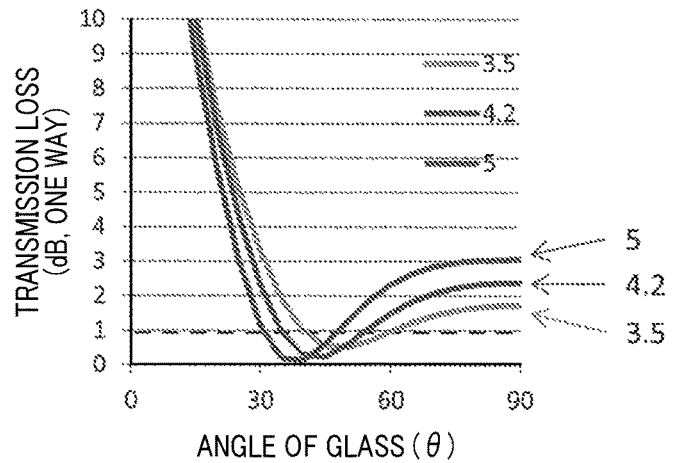

FIG. 4 is a graph showing the result of a relationship between the transmission loss (dB) of the antireflection structure 1 and the angle θ obtained by performing a simulation. FIG. 4 (a) shows the case of a vertically polarized wave, FIG. 4 (b) shows the case of a horizontally polarized wave, and FIG. 4 (c) shows the case of a 45° polarized wave. The angle θ is an angle of an incident direction of a millimeter wave (at a frequency of 76.5 GHz) with respect to the front surface 10a of the substrate 10, and θ=90° when the millimeter wave is perpendicularly incident on the antireflection structure 1. The substrate 10 has a thickness of 5.2 mm and the antireflection film 11 has a thickness of 0.65 mm, and electromagnetic waves in three polarization directions, i.e., a vertically polarized wave, a horizontally polarized wave, and a 45° polarized wave are used. The substrate 10 itself has a transmission loss of 0. Furthermore, the relative dielectric constant of the antireflection film 11 is controlled to be three values, i.e., 3.5, 4.2, and 5.0.

As shown in FIG. 4 (a), in the case of the vertically polarized wave, when the relative dielectric constant is 3.5 and the angle θ is in the range of 55° to 60°, the transmission loss exceeds 1 dB, but when the angle θ is in the range of 30° to 55°, the transmission loss is 1 dB or less, and when the relative dielectric constant is 4.2 or 5.0 and the angle θ is in the range of 30° to 60°, the transmission loss is 1 dB or less.

As shown in FIG. 4 (b), in the case of the horizontally polarized wave, when the relative dielectric constant of the antireflection film 11 is 3.5 and the angle θ is in the range of 40° to 60°, when the relative dielectric constant is 4.2 and the angle θ is in the range of 30° to 55°, and when the relative dielectric constant is 5.0 and the angle θ is in the range of 30° to 50°, the transmission loss is 1 dB or less. Accordingly, it has been found that by controlling the relative dielectric constant of the antireflection film 11 to be in the range of 3.5 to 5.0, a transmission loss of 1 dB or less can be achieved at an angle θ in the range of 30° to 60°.

As shown in FIG. 4 (c), in the case of the 45° polarized wave, when the relative dielectric constant of the antireflection film 11 is 3.5 and the angle θ is in the range of 40° to 60°, when the relative dielectric constant is 4.2 and the angle θ is in the range of 35° to 55°, and when the relative dielectric constant is 5.0 and the angle θ is in the range of 30° to 50°, the transmission loss is 1 dB or less. Accordingly, it has been found that by controlling the relative dielectric constant of the antireflection film 11 to be in the range of 3.5 to 5.0, a transmission loss of 1 dB or less can be achieved at an angle θ in the range of 30° to 60°.

Thus, in the antireflection structure 1 of the first embodiment, by controlling the relative dielectric constant of the antireflection film 11 by changing the radius r of the holes 12 and the period S of the pattern of the holes 12, a transmission loss of 1 dB or less can be achieved for any polarized wave at an angle θ in the range of 30° to 60°. Furthermore, it has been found that in the antireflection structure 1 of the first embodiment, the transmission loss is 1 dB or less in a large angle range. Accordingly, even when the relative dielectric constant is varied to some extent, variation of the transmission loss is small. That is, it has been found that even when a manufacturing error to some extent occurs in the radius or the pattern of the holes 12 during processing of the holes 12, the antireflection structure 1 of the first embodiment is less likely to be influenced by the manufacturing error.

As a first comparative embodiment, for the case of an antireflection structure including only the substrate 10 without including the antireflection film 11, a relationship between the transmission loss and the angle θ has been obtained by performing a simulation in the same manner. Other conditions are the same.

Figure 5:
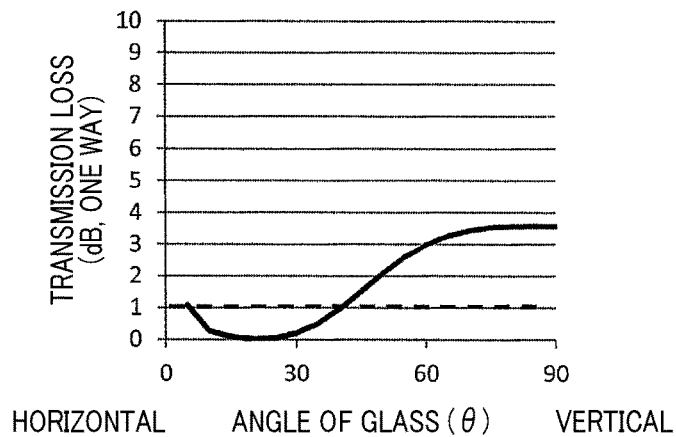
FIG. 5 is a graph showing a relationship between a transmission loss (dB) of an antireflection structure and an angle θ of a first comparative embodiment.
Figure 5:
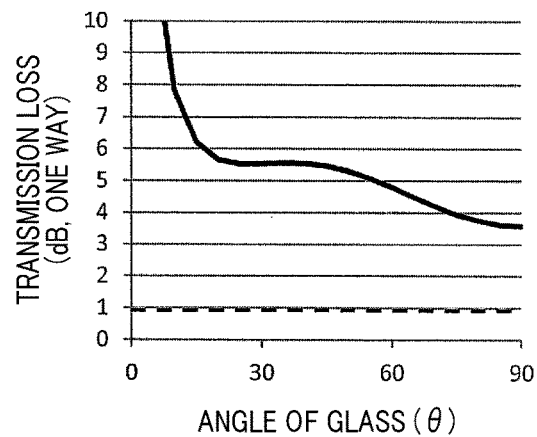
Figure 5:
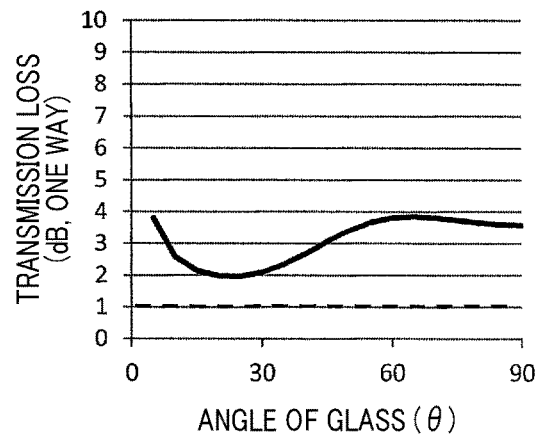

FIG. 5 is a graph showing the results. FIG. 5 (a) shows the case of a vertically polarized wave, FIG. 5 (b) shows the case of a horizontally polarized wave, and FIG. 5 (c) shows the case of a 45° polarized wave. As shown in FIG. 5, in the case of the horizontally polarized wave and the 45° polarized wave, the transmission loss exceeds 1 dB at an angle θ in any range, and in the case of the vertically polarized wave, the transmission loss exceeds 1 dB at an angle of 45° or more. Thus, in the case of the antireflection structure including only the substrate 10, the transmission loss is large and a detection distance of the millimeter wave radar device 2 is small.

As a second comparative embodiment, for the case of an antireflection structure including the antireflection film 11 that has no hole 12, has a relative dielectric constant of 5, and has a thickness varying between three values, i.e., 0.44 mm, 0.55 mm, and 0.65 mm, a relationship between the transmission loss and the angle θ has been obtained by performing a simulation. Other conditions are the same.

Figure 6:
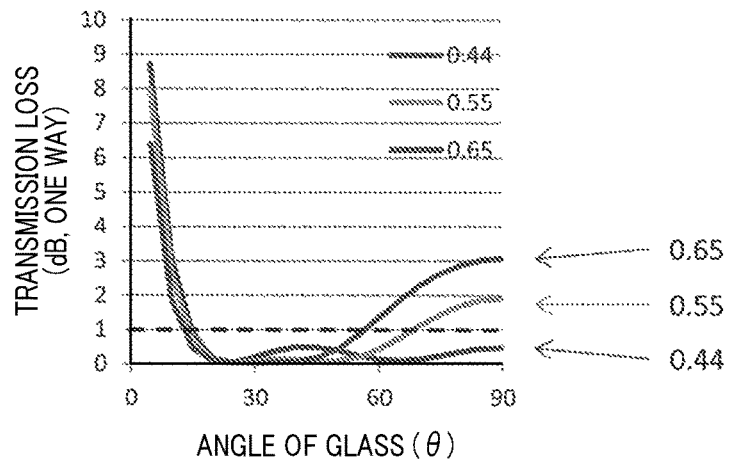
FIG. 6 is a graph showing a relationship between a transmission loss (dB) of an antireflection structure and an angle θ of a second comparative embodiment.
Figure 6:
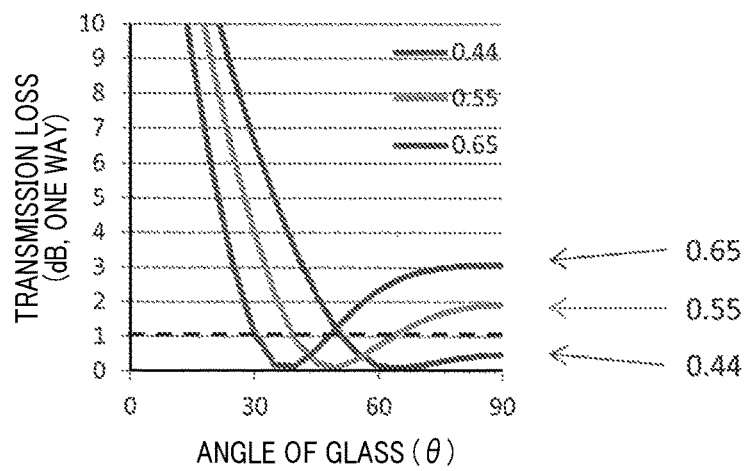
Figure 6:
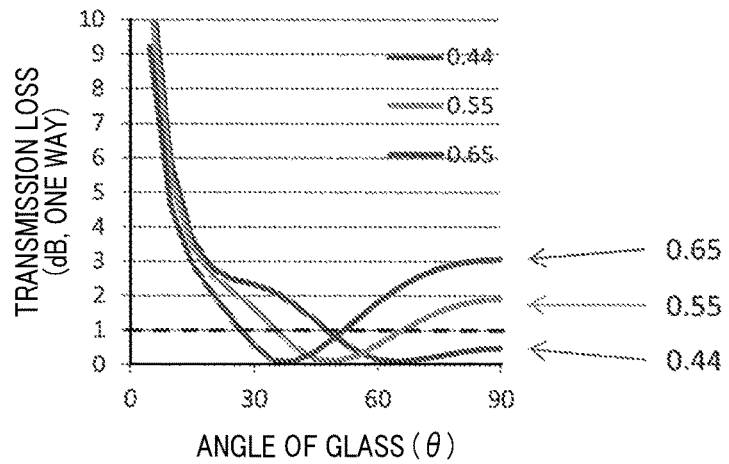

FIG. 6 is a graph showing the results. FIG. 6 (a) shows the case of a vertically polarized wave, FIG. 6 (b) shows the case of a horizontally polarized wave, and FIG. 6 (c) shows the case of a 45° polarized wave. As shown in FIG. 6, it has been found that in the case of any of the polarized waves, the transmission loss is smaller than in the first comparative embodiment, and particularly in the case of the horizontally polarized wave and the 45° polarized wave, the transmission loss is much smaller.

As shown in FIGS. 6 (b) and (c), it has been found that in the case of the horizontally polarized wave and the 45° polarized wave, however, the transmission loss is 1 dB or less in a small angle range, and the angle range is greatly shifted by the variation in the thickness. Thus, it has been found that when the antireflection film 11 has no hole 12 and improvement of the transmission loss is possible only by adjusting the thickness of the antireflection film 11, accurate adjustment of the thickness is required, and the antireflection structure is more likely to be influenced by a manufacturing error or the like.

VARIOUS MODIFICATIONS

The antireflection structure of the first embodiment allows a millimeter wave at a frequency of 76.5 GHz to be transmitted. However, the present disclosure is not limited to an electromagnetic wave having a specific wavelength, but is applicable to an electromagnetic wave having any wavelength. In particular, the present disclosure is effective in reducing reflection of a millimeter wave (with a wavelength of 1 to 10 mm). This is because it has conventionally been difficult to reduce reflection of a millimeter wave by using a structure manufactured at low cost. For the same reason, the present disclosure is particularly effective in reducing reflection of an electromagnetic wave incident at an angle in the range of 30° to 60° on the front surface 10a of the substrate 10.

In the first embodiment, the antireflection film 11 is provided on the front surface 10a (surface on the side on which an electromagnetic wave is incident) of the substrate 10. However, the antireflection film 11 may be provided on the back surface 10b of the substrate 10 or on both the front and back surfaces of the substrate 10. However, the present disclosure is particularly effective when the antireflection film 11 is provided only on the front surface 10a of the substrate 10. In a case where the present disclosure is applied to a vehicle window glass, an outer surface of the window glass is in contact with outside air and a wiper and the like come into contact with the outer surface. Accordingly, when the antireflection film 11 is provided on the outer surface of the window glass, a material of the antireflection film 11 needs to be a physically and chemically stable material, and high cost is required. Thus, the antireflection film 11 may be able to provided only on an inner surface of the window glass. In such a case, however, it has conventionally been impossible to reduce reflection at low cost. According to the present disclosure, even when the antireflection film 11 is provided only on the inner surface of the window glass, it is possible to reduce reflection at low cost and reduce the transmission loss.

Furthermore, in the embodiment and the modifications described above, the example has been mainly described in which the antireflection structure 1 is applied to a vehicle-mounted radar device. However, the antireflection structure 1 is not limited to the application to the radar device, but is applicable to various applications (ships, aircrafts, weather/space observation facilities, monitoring devices, and the like) other than the vehicle-mounted radar device. The antireflection structure 1 only needs to be used to reduce or prevent reflection of an electromagnetic wave incident at a desired incident angle on a substrate serving as an object through which the electromagnetic wave is transmitted. In this case, the substrate is not necessarily an essential component, and it is possible to provide a structure in which a main component is an antireflection film provided on a front surface of the substrate.

INDUSTRIAL APPLICABILITY

The present disclosure is applicable to various applications such as a vehicle window glass, and is capable of reducing loss when an electromagnetic wave is emitted from a vehicle-mounted radar and transmitted to the outside through the window glass.

What is claimed is:

1. An antireflection structure that prevents reflection of an electromagnetic wave incident at a desired angle θ, the antireflection structure comprising:
    a substrate; and
    an antireflection film provided on a front surface of the substrate, wherein:
    the antireflection film is made of a material having a relative dielectric constant lower than a relative dielectric constant of the substrate;
    the antireflection film has a plurality of holes each of which has a radius and that are formed to pass through front and back surfaces of the antireflection film in a given arrangement pattern and formed to control a relative dielectric constant of the antireflection film;
    a thickness and the relative dielectric constant of the antireflection film are set according to a thickness and the relative dielectric constant of the substrate and the desired angle θ so that reflection on the front surface of the antireflection film and reflection on a back surface of the substrate cancel each other; and
    the antireflection film is composed of multiple layers, and each of the multiple layers is configured so as to have different relative dielectric constants, wherein
    the relative dielectric constants of the multiple layers are set so that the relative dielectric constant of the antireflection film gradually increases toward the substrate.

2. The antireflection structure according to claim 1, wherein the thickness of the antireflection film is adjusted by laminating the multiple layers and set by changing the number of laminated layers of the antireflection film.

3. The antireflection structure according to claim 1, wherein the antireflection film is composed of multiple layers, and the thickness of the antireflection film is set by combining layers having different thicknesses.

4. The antireflection structure according to claim 1, wherein the plurality of holes are formed in a periodic pattern, and a period of the pattern is ½ or less of a wavelength of an electromagnetic wave that is transmitted through the hole.

5. The antireflection structure according to claim 1, wherein the radius of each of the holes is ¼ or less of a wavelength of an electromagnetic wave that is transmitted through the hole.

6. The antireflection structure according to claim 1, wherein
    a value of the relative dielectric constant of at least one of the multiple layers of the antireflection film is set to a range higher than a value of the square root of the relative dielectric constant of the substrate and lower than a value of the relative dielectric constant of the substrate.

7. The antireflection structure according to claim 1, wherein
    by changing the radius of the holes and a period of the pattern of the holes for each of the multiple layers, each of the multiple layers is configured so as to have the different relative dielectric constants; and
    the radius of the holes and a period of the pattern of the holes for each of the multiple layers are set so that a value of the relative dielectric constant of each of the multiple layers is increased toward the substrate.

8. A method of manufacturing an antireflection structure that prevents reflection of an electromagnetic wave incident at a desired angle θ, the method comprising providing an antireflection film on a front surface of a substrate, the antireflection film being made of a material having a relative dielectric constant lower than a relative dielectric constant of the substrate, wherein:
    the antireflection film has a plurality of holes each of which has a radius and that are formed to pass through front and back surfaces of the antireflection film in a given arrangement pattern and formed to control a relative dielectric constant of the antireflection film;
    a thickness and the relative dielectric constant of the antireflection film are set according to a thickness and the relative dielectric constant of the substrate and the desired angle θ so that reflection on the front surface of the antireflection film and reflection on a back surface of the substrate cancel each other; and the antireflection film is composed of multiple layers, and each of the multiple layers is configured so as to have different relative dielectric constants, wherein the relative dielectric constants of the multiple layers are set so that the relative dielectric constant of the antireflection film gradually increases toward the substrate.

9. The method of manufacturing an antireflection structure according to claim 8, wherein the thickness of the antireflection film is adjusted by laminating the multiple layers and set by changing the number of laminated layers of the antireflection film.

10. The method of manufacturing an antireflection structure according to claim 8, wherein the antireflection film is composed of multiple layers, and the thickness of the antireflection film is set by combining layers having different thicknesses.

11. The method of manufacturing an antireflection structure according to claim 8, wherein the plurality of holes are arranged in a periodic pattern, and a period of the pattern is ½ or less of a wavelength of an electromagnetic wave that is transmitted through the hole.

12. The method of manufacturing an antireflection structure according to claim 8, wherein the radius of each of the holes is ¼ or less of a wavelength of an electromagnetic wave that is transmitted through the hole.

13. An antireflection structure that prevents reflection of an electromagnetic wave incident at a desired angle θ on a substrate through which the electromagnetic wave is transmitted, the antireflection structure comprising an antireflection film provided on a front surface of the substrate, wherein:

the antireflection film is made of a material having a relative dielectric constant lower than a relative dielectric constant of the substrate;

the antireflection film has a plurality of holes each of which has a radius and that are formed to pass through front and back surfaces of the antireflection film in a given arrangement pattern and formed to control a relative dielectric constant of the antireflection film;

a thickness and the relative dielectric constant of the antireflection film are set according to a thickness and the relative dielectric constant of the substrate and the desired angle θ so that reflection on the front surface of the antireflection film and reflection on a back surface of the substrate cancel each other; and the antireflection film is composed of multiple layers, and each of the multiple layers is configured so as to have different relative dielectric constants, wherein the relative dielectric constants of the multiple layers are set so that the relative dielectric constant of the antireflection film gradually increases toward the substrate.

14. The antireflection structure according to claim 13, wherein the thickness of the antireflection film is adjusted by laminating the multiple layers and set by changing the number of laminated layers of the antireflection film.

15. The antireflection structure according to claim 13, wherein the antireflection film is composed of multiple layers, and the thickness of the antireflection film is set by combining layers having different thicknesses.

16. The antireflection structure according to claim 13, wherein the plurality of holes are formed in a periodic pattern, and a period of the pattern is ½ or less of a wavelength of an electromagnetic wave that is transmitted through the hole.

17. The antireflection structure according to claim 13, wherein the radius of each of the holes is ¼ or less of a wavelength of an electromagnetic wave that is transmitted through the hole.

18. The antireflection structure according to claim 13, wherein the front surface of the substrate is a surface on which the electromagnetic wave is incident.

19. The antireflection structure according to claim 13, wherein the front surface of the substrate is a surface through which the electromagnetic wave is transmitted and from which the electromagnetic wave exits.

\* \* \* \* \*